United States Patent [19]

Owens

[11] Patent Number: 5,142,622
[45] Date of Patent: Aug. 25, 1992

[54] SYSTEM FOR INTERCONNECTING APPLICATIONS ACROSS DIFFERENT NETWORKS OF DATA PROCESSING SYSTEMS BY MAPPING PROTOCOLS ACROSS DIFFERENT NETWORK DOMAINS

[75] Inventor: Gary L. Owens, Mountain View, Calif.

[73] Assignee: International Business Machines Corporation, Armonk, N.Y.

[21] Appl. No.: 304,696

[22] Filed: Jan. 31, 1989

[51] Int. Cl.⁵ .......................................... G06F 13/12
[52] U.S. Cl. .............................. 395/200; 364/280.9; 364/284.3; 364/284.4; 364/284; 364/DIG. 1; 395/700; 395/500
[58] Field of Search ................... 395/200, 700, 500; 364/200 MS File, 900 MS File

[56] References Cited

U.S. PATENT DOCUMENTS

| | | | |
|---|---|---|---|
| 4,274,139 | 6/1981 | Hodgkinson | 364/200 |
| 4,322,792 | 3/1982 | Baun | 364/200 |
| 4,415,986 | 11/1983 | Chadra | 364/900 |
| 4,500,960 | 2/1985 | Babecki | 364/200 |
| 4,530,051 | 7/1985 | Johnson | 364/200 |
| 4,575,793 | 3/1986 | Morel | 364/200 |
| 4,586,134 | 4/1986 | Norstedt | 364/200 |
| 4,604,686 | 8/1986 | Reiter | 364/200 |
| 4,612,416 | 9/1986 | Emerson | 379/88 |
| 4,631,666 | 12/1986 | Harris | 364/200 |
| 4,677,588 | 6/1987 | Benjamin et al. | 364/900 |
| 4,679,189 | 7/1987 | Olson | 370/60 |
| 4,703,475 | 10/1987 | Dretzka et al. | 370/60 |
| 4,706,081 | 11/1987 | Hart | 340/825.03 |
| 4,736,369 | 4/1988 | Barzilai | 370/94.1 |
| 4,760,395 | 7/1988 | Katzeff | 370/60 |
| 4,768,150 | 8/1988 | Chang et al. | 364/300 |
| 4,790,003 | 12/1988 | Kepley | 379/88 |
| 4,811,216 | 3/1989 | Bishop | 364/200 |
| 4,825,354 | 4/1989 | Agrawal | 364/200 |
| 4,831,518 | 5/1989 | Yu | 364/200 |
| 4,849,877 | 7/1989 | Bishop | 364/200 |
| 4,855,906 | 8/1989 | Burke | 364/200 |
| 4,882,674 | 11/1989 | Quint | 364/900 |
| 4,893,307 | 1/1990 | McKay | 370/60 |
| 4,901,231 | 2/1990 | Bishop | 364/200 |

OTHER PUBLICATIONS

Introducing the UNIX System by H. McGilton and R. Morgan pp. 1-7 McGraw-Hill Software Series.
The UNIX Book by Mike Banahan and A. Rutter, J. Wiley & Sons Inc. 1983 pp. 107-120.
The Design of the UNIX Operating System, by Bach, M. J., 1986, Prentice Hall, Englewood Cliffs, N.J.
Dictionary of Computing, 8th Ed., Mar. 1987, IBM Document Composition Facility pp. 238, 326.
Data Communications, vol. 16, No. 5, May 1987, New York, US, pp. 120-142, "SNA to OSI: IBM Building Upper-Layer Gateways" by Thomas J. Routt.
The Sixth International Phoenix Conference on Computers and Communications Feb. 25, 1987, Scottsdale, Ariz., USA, pp. 354-360 by R. Martinez et al.
IEEE Micro, vol. 5, No. 2, Apr. 1985, New York, US, pp. 53-66, "A Multimicrocomputer-based Structure for Computer Networking" by A. Faro et al.
IEEE Infocom '87, Proceedings, Sixth Annual Conference, Mar. 31, 1987, San Francisco, Calif., USA, pp. 1045-1052, "Gateways for the OSI Transport Service" by G. V. Bochman et al.
Proceedings, Ninth Data Communications Symposium, Sep. 10, 1985, Whistler Mountain British Columbia, pp. 2-8 "Development of a TCP/IP for the IBM/370" by R. K. Brandiff et al.

*Primary Examiner*—Thomas C. Lee
*Assistant Examiner*—Eric Coleman
*Attorney, Agent, or Firm*—Wayne P. Bailey; Marilyn D. Smith

[57] ABSTRACT

The system and method of this invention automatically routes a connection between data processing systems in different network domains. As an example, an application running on a data processing system utilizing a network domain such as TCP (Transmission Control Protocol), can automatically make a connection to another data processing system utilizing a different network domain such as SNA (Systems Network Architecture). The connection is automatically performed in the layer containing the communication end point objects. In a preferred embodiment, the connection is automatically performed in the socket layer of the AIX operating system, or in the socket layer of other operating systems based upon the Berkeley version of the UNIX operating system.

8 Claims, 7 Drawing Sheets

SYSTEM FOR INTERCONNECTING APPLICATIONS ACROSS DIFFERENT NETWORKS OF DATA PROCESSING SYSTEMS BY MAPPING PROTOCOLS ACROSS DIFFERENT NETWORK DOMAINS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a network of data processing systems, and more specifically to the interconnection of a plurality of data processing systems between different network protocol domains, such as the different network protocol domains of SNA and TCP/IP.

2. Description of the Related Art

A system having multiple domains has at least one data processing system that is interconnected to at least two different data processing systems through at least two different network domains, i.e. network protocol architectures. A problem with multiple domains is the difficulty in allowing communication between machines which are connected to another type of network. For example, a data processing system utilizing SNA LU 6.2 as its network protocol can not automatically communicate with another data processing system utilizing TCP/IP as its network protocol. Both SNA LU 6.2 and TCP/IP are examples of stream protocols where data flows as a stream of indeterminate lengths, and the bytes are delivered in the correct order. The problem is routing a stream of bytes from a data processing system that utilizes a reasonably equivalent protocol, such as a stream protocol, to another data processing system that also utilizes a reasonable equivalent protocol, such as the stream protocol of this example, but wherein the two protocols are not the exact same protocol, such as SNA LU 6.2 and TCP/IP.

It is known to solve the above problem at the application program level. An application program which is running on a data processing system at one end of the connection may be designed to utilize a specific network protocol. In this case, it is known to modify the application in order to reimplement the application to work over another protocol. This requires changing the source program code of the original application by some amount. Depending upon how the application program was originally designed, this may require a substantial amount of changes to the program code.

It is also known to solve the above problem by implementing the same protocol on both machines. For example, in order to use an SNA transaction application running in an SNA network, to apply transactions against data processing systems utilizing a TCP network, one could reimplement that transaction application against TCP by then putting TCP on the client data processing system, put IP over SNA, and gateway between the two. The client data processing system can then be implemented utilizing TCP/IP. The problem with this approach is having to reimplement the application to utilize the different protocol at one end of the network or the other. This is especially burdensome if the application is large and complex.

There are some application level protocols that handshake back and forth over SNA, e.g. 3270 SNA. These have their own data format with meta-data in the data stream. There are other application level protocols, such as Telnet over TCP, that talk back and forth that have meta-data and data in the data stream. However, one can not get these two to talk together since these two have different data and meta-data in their data streams.

If an application utilized one protocol, and that application were to run on a data processing having a different protocol, knowing the data stream format, one could write the client half of the application on the data processing system utilizing the other protocol.

Therefore, in order to extend network connectivity, it is known to reimplement the application to utilize the different protocol, put one protocol on top of the other, and gateway between the two. It is also known to build a larger network utilizing each type of protocol through replication and duplication.

The term "sockets" is an application program interface (API) that was developed for the Berkeley version of AT&T's UNIX[1] operating system for interconnecting applications running on data processing systems in a network. The term socket is used to define an object that identifies a communication end point in a network. A socket can be connected to other sockets. Data can go into a socket via the underlying protocol of the socket, and be directed to appear at another socket. A socket hides the protocol of the network architecture beneath a lower layer. This lower layer may be a stream connection model (virtual circuit), or a datagram model (packet), or another model.

[1] UNIX is licensed and developed by AT&T. UNIX is a registered trademark of AT&T in the U.S.A. and other countries.

A stream connection model refers to a data transmission in which the bytes of data are not separated by any record or marker. A virtual circuit implies that there appears to be one communications end point connected to one other communications endpoint. When the connection is established, only those two end points can communicate with each other.

Sockets are typed by domain (address family or network type), and model type (stream, datagram, etc.). If needed, the socket can be further specified by protocol type or subtype. The domain specifies the addressing concept utilized. For example, there is an internet IP domain, and also a SNA domain for networks utilizing TCP and SNA, respectively. As used herein, the word "domain" is used to refer to the address family of a socket, and not to a domain-naming domain. A domain-naming domain is a concept of a related group of hierarchical addresses, wherein each part of the address is separated by a delimiter, such as a period.

Since a socket is specified by the domain, sockets do not allow cross domain connections. This means that if an application program creates a socket in the Internet (Darpa) domain, it can only connect to sockets in that same domain. Note: "Darpa" is used to specify that Internet, short for internetworking, is not only used herein both to generically specify the internet layer of a particular protocol family which contains means for forwarding, routing control, and congestion control, etc., but also as a name for a particular implementation of an internet called the Internet or the Darpa Internet, or the Arpa Internet. Another name for this internet layer is the Internet Protocol (IP). TCP/IP is also commonly used to refer to this protocol.

Originally, the requirement that a socket can only connect to sockets in the same domain was a reasonable restriction. This simplified the program code when there was only one really useful domain anyway. With the advent of the usage of other domains (specifically SNA), cross domain connections have become desirable. For example, cross domain connections would allow mailers to transport mail among domains. Also, cross domain connections would allow programs to communicate using the existing communication networks.

SUMMARY OF THE INVENTION

It is therefore an object of this invention to automatically route connections between data processing systems that utilize different protocols, independently of said applications running on said data processing systems.

It is a further object of this invention to route, at the socket level, between two networks when a cross-domain connection attempt is detected.

It is a further object of this invention to facilitate the interconnection between data processing systems by allowing socket based applications to easily span across different networks.

It is a further object of this invention to communicate between data processing systems in which one of the data processing systems utilizes TCP/IP and the other data processing system utilizes SNA.

It is a further object of this invention to communicate between two data processing systems via a third data processing system utilized as a TCP to SNA gateway.

It is a further object of this invention to communicate through a connection between two data processing systems both utilizing TCP on each of their local Internets, by bridging the network connection with a long haul SNA connection.

The system and method of this invention automatically routes a connection between data processing systems, independently of an application running on the data processing systems, having different network domains. The preferred embodiment describes the cross domain interconnections with reference to the different network domains of TCP (transmission control protocol) and SNA (systems network architecture).

The routing is automatically performed at a layer which contains the communication end point objects. In the AIX[2] operating system, and other operating systems based upon the Berkeley version of the UNIX operating system, this layer is called the socket layer.
[2]Trademark of IBM Corporation An intermediate processing system is utilized to gateway between a processing system utilizing a network domain such as TCP, and another processing system utilizing a different network domain such as SNA. Alternatively, the client data processing system can be implemented utilizing TCP/IP which can then be gatewayed through socket routing on the same machine into an SNA data stream without an intermediate processing system performing the socket routing.

In any event, the socket layer which performs the socket routing contains facilities to automatically route a connection across different domains.

In the client processing system which is attempting to create a connection, a socket is created in a particular domain. If the socket is in a different domain, the socket does not fail if the socket routing facility of this invention is implemented. The connect function is modified to catch the attempts at a cross domain connection. If a connect function is attempted on a socket in a different domain, then the socket routing facility of this invention is invoked.

Alternatively, a connectto function can be implemented which takes the place of and combines the functions of the socket function and the connect function. With the connectto function, a socket is not created until the route is known. This alleviates the unnecessary work of creating a socket which may fail, and then performing actions as a result of the failed socket. The connectto function determines how a connection can be made, and then creates a socket in the domain that is needed to establish the determined connection.

Through either of the above approaches, a connection to a socket in a different domain can be made through an intermediate socket. When data arrives from one end of the connection to the intermediate socket, the intermediate socket immediately sends the data to the other end of the connection instead of queuing the data for process intervention at the intermediate processing system.

In addition, if the intermediate socket is queried for the address of the other end of the connection, the intermediate socket identifies the connecting host as opposed to the intermediate host. In this way, the socket routing facility of the intermediate host is transparent to the hosts at each end of the connection.

DESCRIPTION OF THE PREFERRED EMBODIMENT

The following description describes an architecture for routing virtual circuits based on sockets. Although this implies stream sockets, the invention is not limited to stream protocols or to sockets. The concepts of this invention could be applied to similar communication end points that are utilized within other operating systems.

Figure 1:
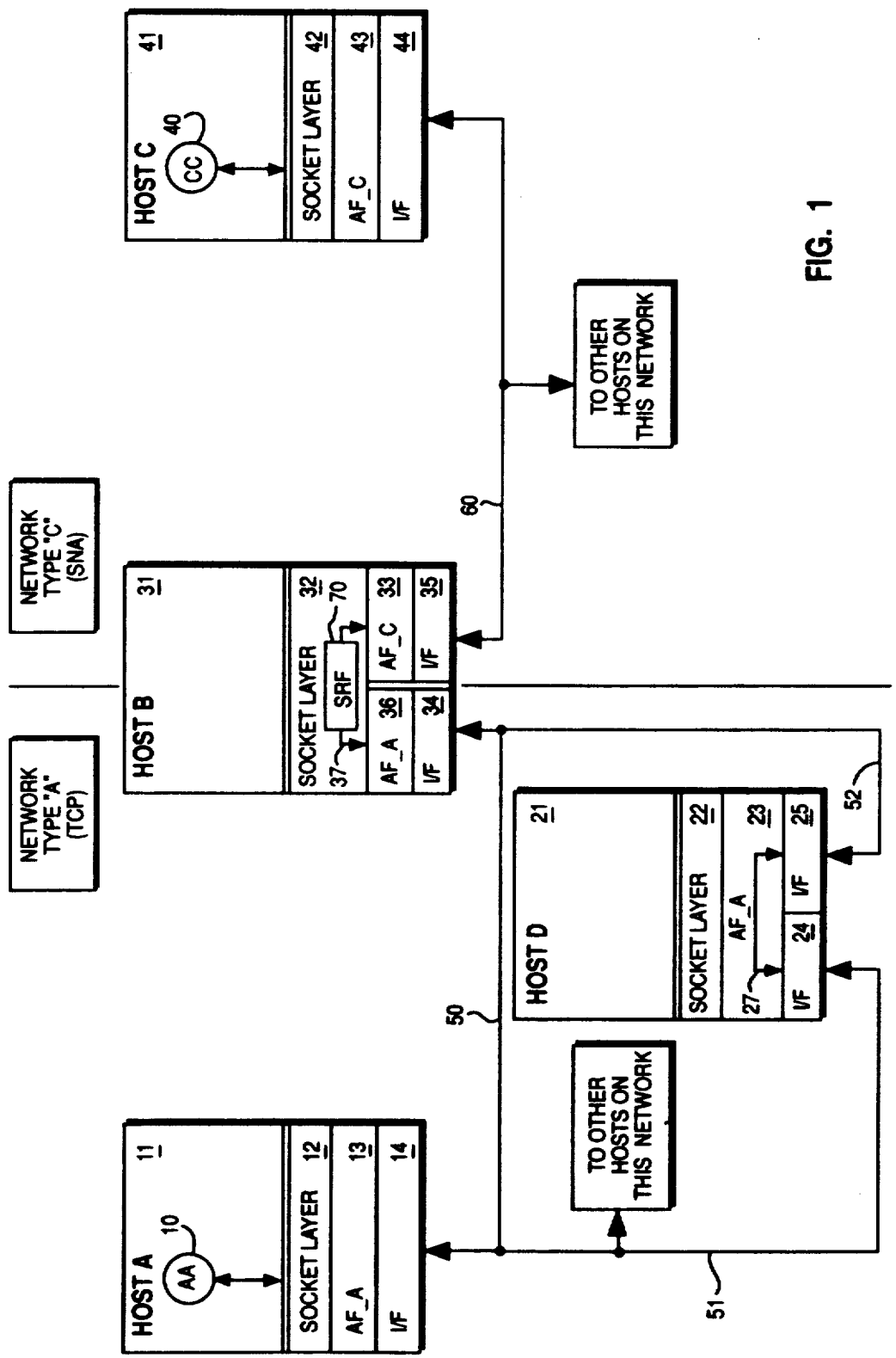
FIG. 1 is a diagram showing a connection from a process AA on host A to a process CC on host C. Socket routing is utilized to cross the boundary between the networks of type A and type C at host B.

Referring to FIG. 1, a process AA, 10, in a data processing system 11, host A, desires to connect its socket facilities 12 to the process CC, 40, in a data processing system 41, host C. The data processing system 11 is shown as only supporting a particular domain of sockets AF_A, 13, such as TCP, and data processing system 41 is shown as only supporting sockets that exist in the domain having address family C, 43. Since the naming conventions and the underlying transport mechanisms are different between address family A, 13, and address family C, 43, no interconnection can take place without an intermediate facility. The intermediate facility is the socket routing facility 70 in socket layer 32, which exists in data processing system 31, shown as host B.

To describe the initiation of a connection, the process AA, 10, in the data processing system 11, will activate a connection through the sockets programming interface to the general socket code, 12, which in turn goes through the address family specific socket code for AF_A, 13. The necessary data and control information will be handled by the interface and physical access layers, 14. The data will then go out on the network 50 and end up going into data processing system 31, shown as host B, via the interface layer 34, and then through the code for address family 30 A, shown as AF_A, 36.

For comparison, data processing system 21, shown as host D, shows existing internet routing within a single address family, the address family A, AF_A, 23. It should be noted that the cross connection occurs within the address family A, 23. Almost any TCP/IP implementation can route within its own address family. Likewise, SNA has similar gateway and forwarding capabilities. The cross over as shown in data processing system 21 is independent of the model type of either stream or datagram. It is only dependent upon being within the same network domain.

In data processing system 31, the connection request packets will go through the interface layer code 34 to the address family A code, AF_A, 36, through the general socket layer 32, and into the socket routing code 70. The socket routing code facility 70, is where the address mapping and cross connection takes place. The cross connection arrows 37 are shown drawn in the socket routing layer 70 of data processing system 31, as opposed to the cross connection arrows 27 which are shown in the address family code 23 of data processing system 21.

A connection request generated in the socket routing code 70 of data processing system 31 will then go down through the address family C code, AF_C, 33, and through the interface layer code 35 for the other network 60, such as SNA. The connection request packets go across the network 60 to the interface layer code 44, up to the address family C code, AF_C, 43, continuing through the general socket interface layer code 42 where the connection is registered. Then the process CC, 40, can respond to the connection request in order to establish the connection between cross domain networks.

Figure 7:
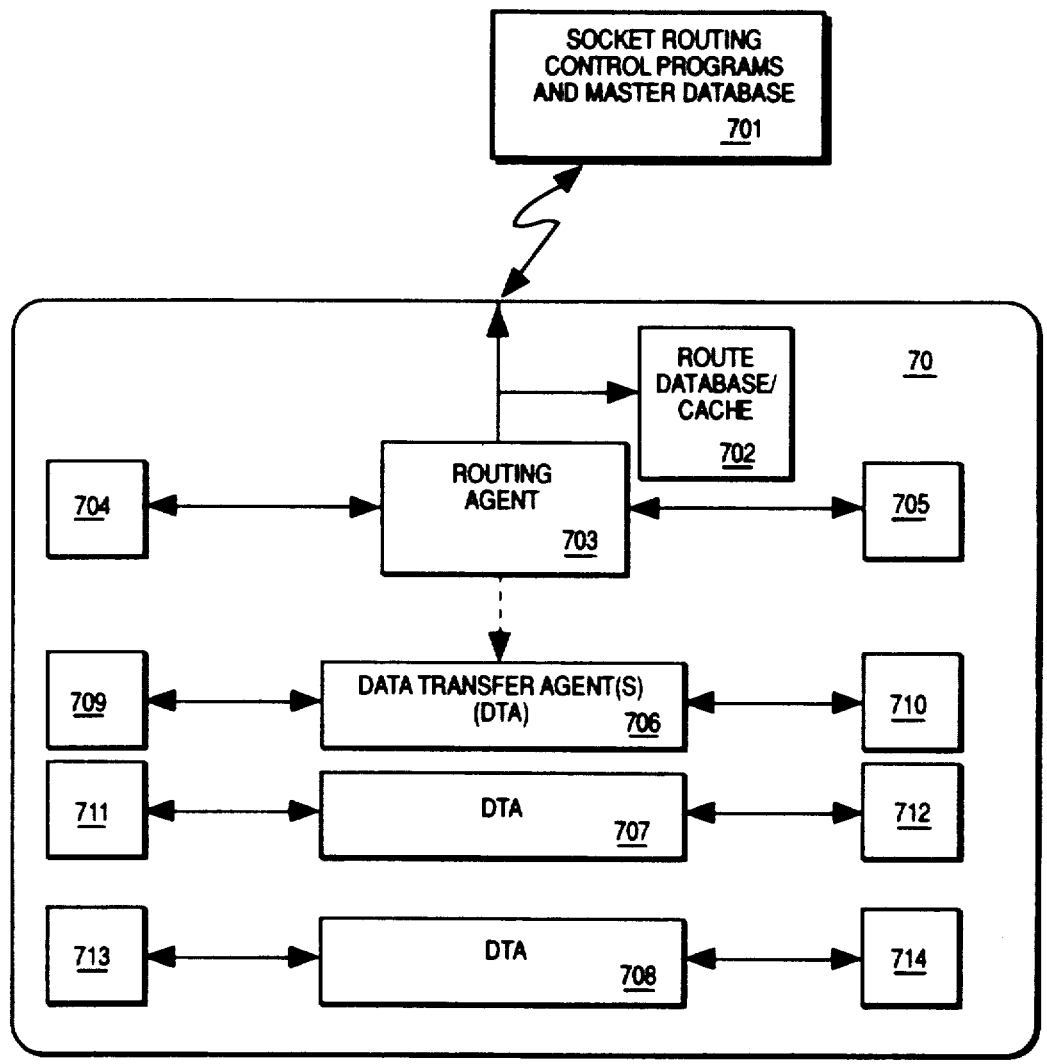
FIG. 7 is a more detailed diagram of the socket routing facility of this invention.

FIG. 7 shows item 70 of FIG. 1 in greater detail. Item 701 is the programs and data for controlling the socket routing facility. A connection request to establish socket routing will come in on the sockets for this service, items 704, and 705. The routing agent software, item 703, will accept the connection, which creates a data socket, items 709-714. The route request message will come in on that data socket, and the routing agent, 703, will consult its route database, 702, to see if a route is possible. If a route is possible, the routing agent, 703, will consult its route database, 702, on how to establish the route. Then, the routing agent creates a matching data socket (item 710 for item 709, etc.), and connects to the next hop. When the routing agent software receives any replies for further route hops, it forwards them back to the socket routing requestor via the accepted data socket. When all hops are made, the socket routing agent will create a data transfer agent, items 706-708, that joins the pairs of data sockets, and forwards data from one to the other and vice versa.

The above scenario is further described in the following programming design language code. The following includes examples and uses programs and function names to describe the operational scenario of FIG. 1. The following operational scenario assumes a telnet (or similar program) connected to a remote processing system that is separated by at least one domain boundary. The following uses three machines: "host_A" is connected to "host_B" via TCP, and "host_B" is connected to "host_C" via SNA.

```
*/from application view/*
user on host_A says "telnet host_C"
telnet does a gethostbyname for "host_C"
telnet tries to create a socket for domain of "host_C"
    - it fails
telnet does a getservbyname for sockroute
    - it finds (the only) sockroute available in TCP
      domain
telnet invokes sockroute function to get which domain
    to initiate the connection in (or to get a route
    to host_C)
since telnet knows it is now using socket routing it
    uses the (initial domain and routelist) to
    1. create a socket in its initial domain. (TCP)
    2. connects to sockaddr of "host_C" telnetd
        -or "connectto routelist telnetd"
when socket connect succeeds, proceed as any
    SOCK_STREAM app would
- alternatively ( with connectto() as "full function")
user on host_A says "telnet host_C"
telnet does a gethostbyname (or getaddrbyname) for
    "host_C" - to see if it exists and to get
    host_C's address
telnet does a "connectto ( host_C:telnetd,
    SOCK_STREAM) - which gets a connected socket.
            COPYRIGHT IBM CORPORATION 1988
```

The above program design language code is further explained with reference to FIGS. 2-4. The term "telnet" is a remote terminal emulator having the argument "host_C". This invokes the terminal emulator to a remote host, which in this case is "host C", step 201, FIG. 2. "Gethostbyname" is a function call of the telnet program which gets the addressing information for host C, step 203, FIG. 2. The addressing information for host_C will include a domain and an address within the domain.

At this point, the routing can be performed either explicitly or implicitly. Explicit action would involve the user code invoking a router function, if the initial attempt to create a socket fails. Implicit action would simply be doing a connectto ( ) on the destination address. In explicit routing, the advantage is explicit control by the application. The disadvantages are lack of centralized control, and more complicated user code. In implicit routing, the advantages and disadvantages are just the opposite of those stated above. In implicit routing, the advantages are more centralized control, and less complicated user code. In implicit routing, the disadvantage is that the application does not have direct control.

With explicit routing, Telnet tries to create a socket within that domain, step 204. If the host does not have sockets of that domain, step 205, the socket creation will fail, step 211. At this point, the application, Telnet, invokes a router function, step 213 FIG. 4, if the socket attempt failed, step 211. If the host does have sockets within this domain, the socket attempt will succeed, step 206. If the socket attempt succeeds, the application does a connect ( ), step 215. The connect ( ) is further shown with reference to FIG. 3. If the connect ( ) succeeds, step 217, FIG. 2, the communication between the two processes proceeds as is typically known in the art, step 207.

If a connect in the same socket domain failed, then (possibly with a socket option set) the socket routing would be invoked. This provides implicit routing, FIG. 3, even in the case of a connection between two domains of the same type, using an intermediate domain of different type.

Figure 3:
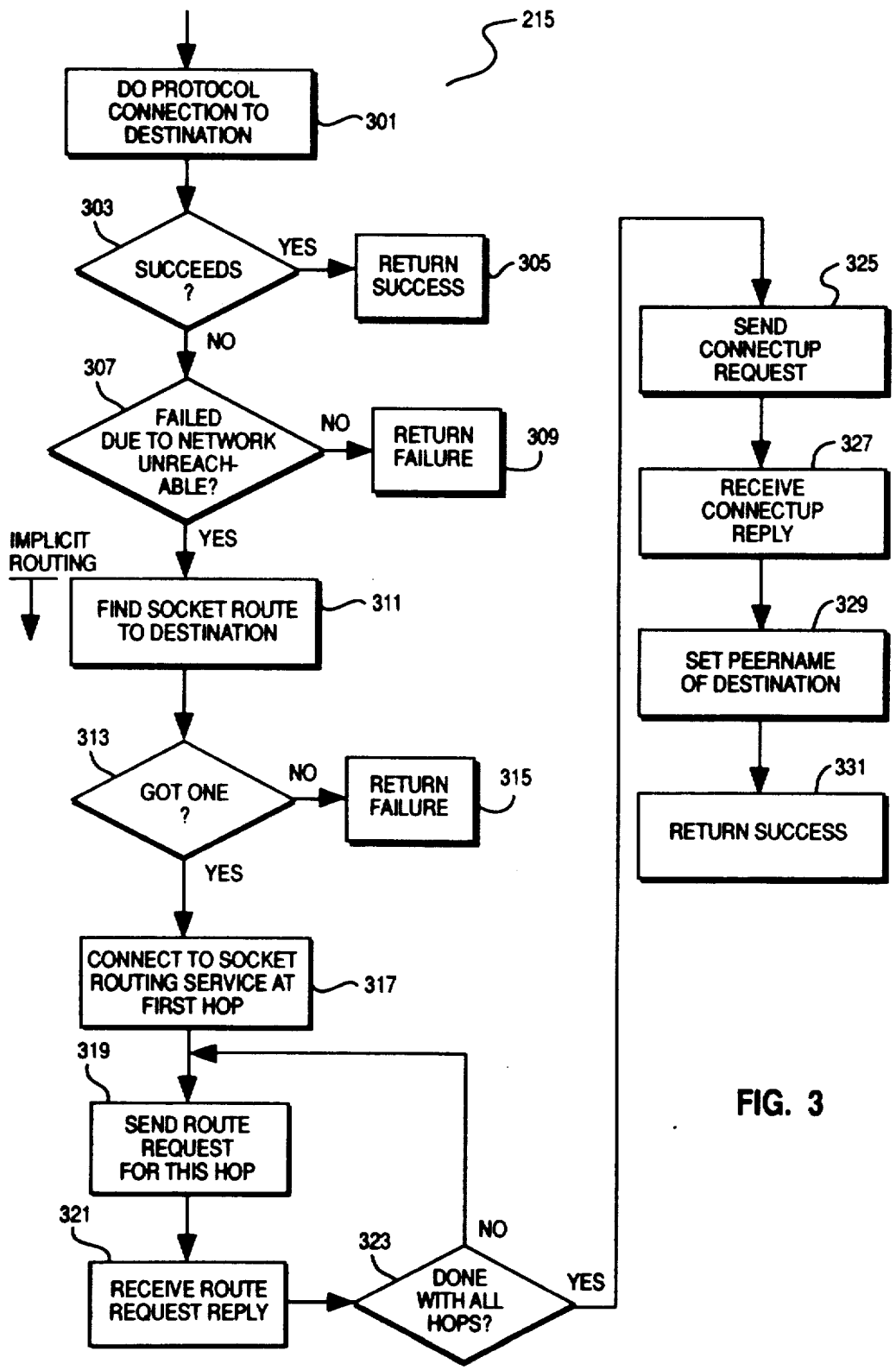
FIG. 3 is a flow diagram showing the modified steps in performing a connect ( ) function to a destination.

As shown in FIG. 3, modifying the function connect ( ) enables the connect ( ) to catch those situations in which socket routing is needed to gateway between two like domains using unlike domains. If a normal connection, step 301, fails, step 303, and the failure is due to the destination network being unreachable, step 307, then an attempt at implicit routing will be made. This begins with step 311 where a socket route is sought for the destination. If no route is found, then an error is reported, step 315. If a route is found, a connection is made to the socket routing service at the first hop, step 317. Then, a route request is sent, step 319, and the route request replies are received, step 321, until all the hops are connected, step 323. At this time, a connect up request is sent to tell all of the routers to set up the line for data transmission, step 325. After the connect up reply is received, step 327, the peer address of the destination is set for the local socket, step 329, and an indication of success is returned to the invoker of this connect, step 331.

Referring back to FIG. 2, a connectto function can be added to the generic socket layer code to implement implicit routing from an application level, step 221, FIG. 2. The connectto function is called instead of a socket function and a connect function. The function of the socket system call and the function of the connect are combined into the connectto function. The advantage of this is that the connectto function can handle more addressing issues. Also the connectto function does not need to create a socket in the kernel, which may fail, and then have to act upon the failed socket.

The socket parameters of the connectto function would include the type and the protocol. Since the previous connect call has arguments for the host name, the connectto function would take the name of the host in a more portable form, such as the name of the host in a text stream, whereas, connect takes the name of the host in a socket structure.

Figure 6:
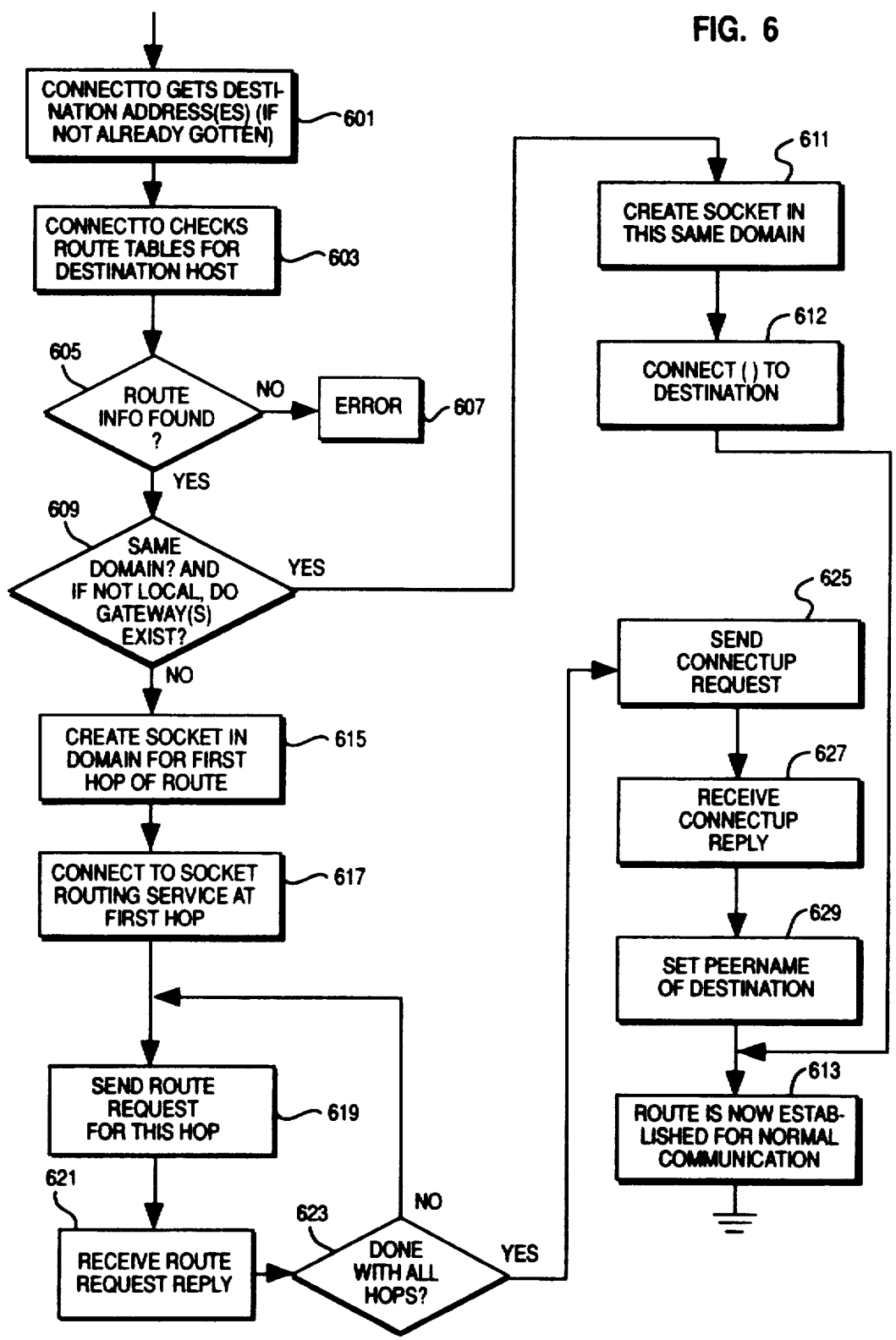
FIG. 6 is a flow diagram showing the steps of a connectto ( ) function.

Referring to FIG. 6, the connectto( ) function is further described. If connectto( ) is implemented so that it takes a host name as an argument, then it gets the destination address, step 601. Using this address, the function checks the route table for the destination, step 603. If no route is found, step 605, then an error is returned, step 607. If the destination is in the same domain, and no unlike domains are required for gateways, step 609, then a socket is created in the same domain, step 611. A normal connection is established to the destination, step, 612. The route for communication is then established, step 613.

If the destination is not the same domain or unlike domains are required for gateways, step 609, then a socket is created in the domain of the first hop, step 615. A connection to the socket routing service at the first hop is then established, step 617. A route request is sent, step 619, and a reply to the request is received, step 621, until all hops are connected, step 623. After this, a connect up request is sent, step 625, and its reply is received, step 627. The peername of the destination is set for the local socket, step 629. The route is now available for normal communications, step 613.

Figure 2:
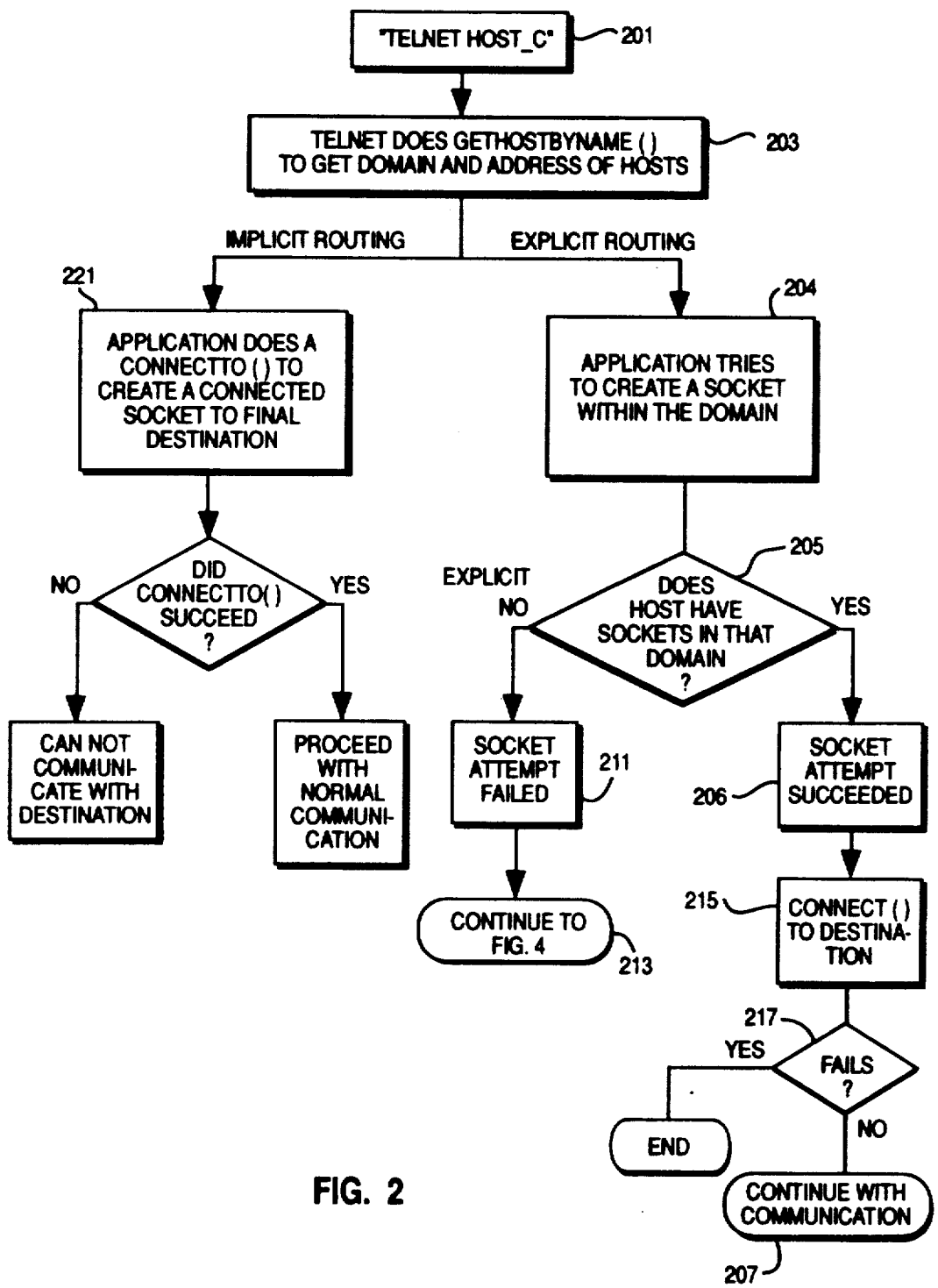
FIG. 2 is a flow diagram showing the operational scenario of FIG. 1 using explicit and implicit routing.
Figure 4:
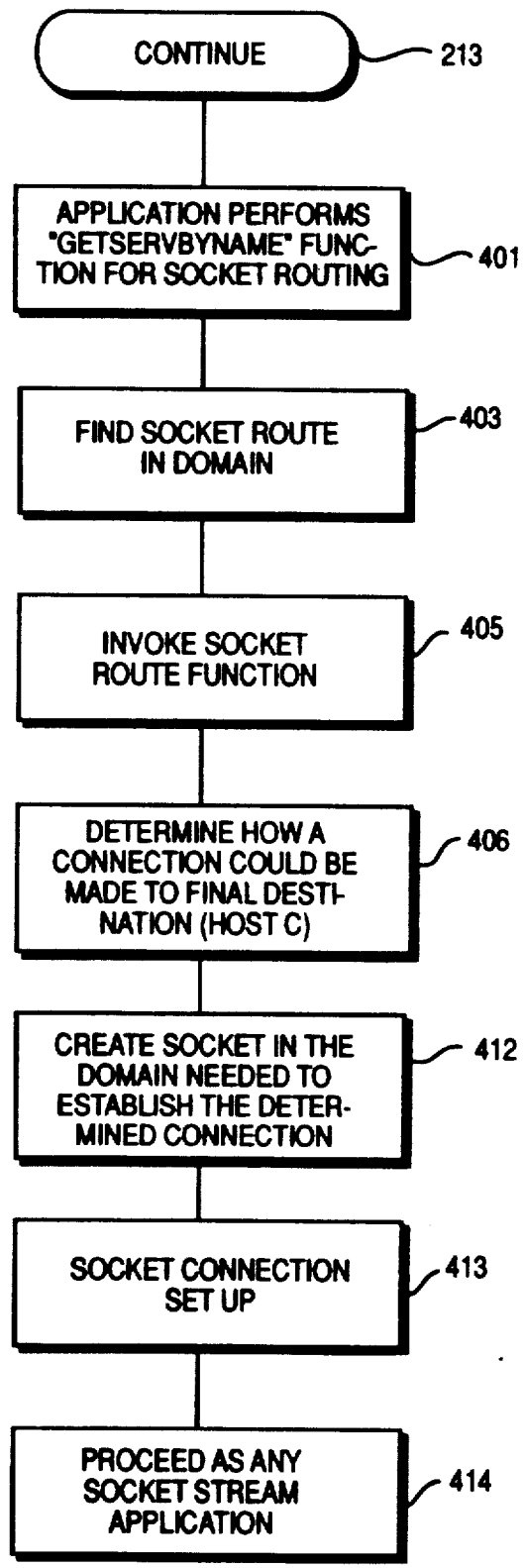
FIG. 4 is a flow diagram showing the steps of creating a socket if the host does not have a socket in the specified domain.

With the following modifications, referred to as socket routing, the creation of a socket can continue, step 213, as shown in FIG. 4, when the host does not have a socket in the specified domain, step 205, FIG. 2. The modifications take place at the client side, host—A. Host—C is referred to as the server.

The telnet application performs a "getservbyname" function for the socket routing service, step 401, FIG. 4. If, for example, the host only has sockets in the TCP domain, telnet will find the only socket route available in the TCP domain, step 403. Next, telnet uses the sockroute function, step 405, to determine the route and what domain of socket to create, step 406. Then, the socket is created for the initial hop of the route, step 412, and then the connection would be set up, step 413. At this point, the application can talk to the host as it otherwise would have with any other socket stream, and in this case, using the telnet data stream, step 414.

Assuming the route initialization is done by a daemon or library function on host—A (and not kernel code), then host—A's socket code doesn't really have much to do with socket routing. Basically, if socket routing is performed outside of the operating system kernel on host—A, then no changes to host—A's socket code need to be made.

Figure 5:
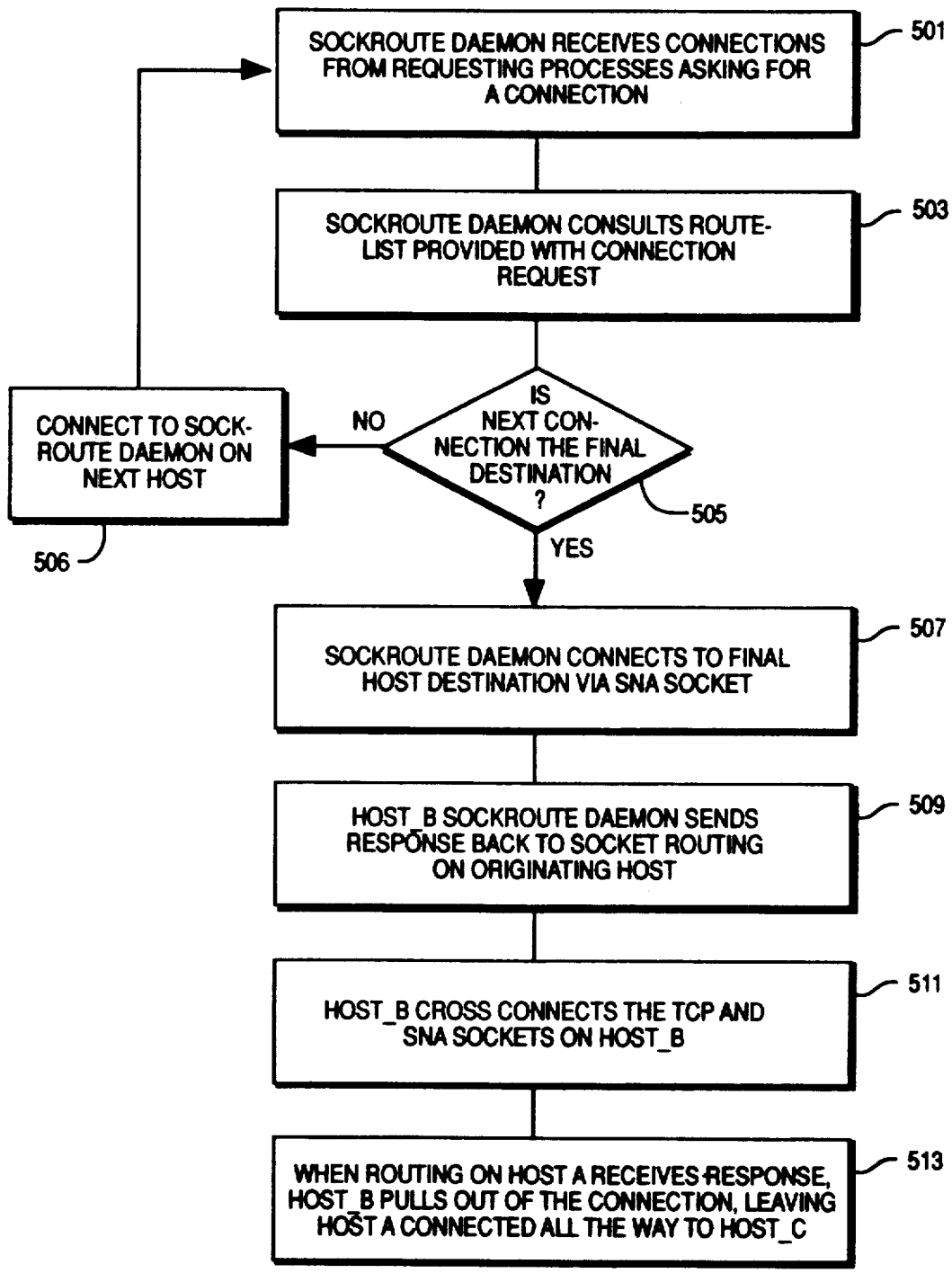
FIG. 5 is a flow diagram showing the steps performed at host B.

The following programming design language code, and the following description with reference to FIG. 5 describes what happens on host—B.

```
*/ on host—B /*
sockroute daemon receive connection from host—A
    (asking for connection to host—C)
sockroute daemon consults route table -or route list
    provided with connection request.
sockroute daemon decides to connectto to host—C via
SNA socket
    (since it is last hop, it doesn't need to connect
    to a sockroute daemon on host—C)
when connection completes, host—B sockroute daemon
    1. sends response back to socket routing on
        host—A
    2. cross connects the TCP and SNA sockets on
        host—B
when routing on host—A receives response, it pulls out
of the way, leaving telnet connected all the way to
host—C
```
COPYRIGHT IBM CORPORATION 1988

Essentially, the above code describes the scenario in which a service waits around for a connection. With reference to FIG. 5, the sockroute daemon, which runs on host—B, receives connections from other processes requesting its services, step 501. The sockroute daemon is analogous to a telephone operator who is requested to make a connection to another person from a caller. The requesting process, caller, supplies the sockroute daemon, operator, with the necessary connection information in order to make the connection, step 503. Once the sockroute daemon makes the connection, the sockroute daemon leaves the connection. If this connection leads to the final destination, step 505, no other sockroute daemons on a next host need to be called, and the sockroute daemon connects to the final host destination via a SNA socket, step 507. However, it is possible to have multiple sockroute daemons, operators, that are needed to make a connection from a first host to a final host destination. If this connection does not lead to the final host connection, then another sockroute daemon on a next host must be called, step 506, and the above steps repeated.

The sockroute daemon on host_B then sends a response back to the socket routing service on the originating host, host_A, step 509. Host_B cross connects the TCP and SNA sockets on host_B, step 511. When the routing service on host_A receives the response, host_B pulls out of the way. This leaves a telnet connection all the way from host_A to host_B, step 513.

It should be noted that since host_C is the end of the line, its socket layer is entirely unaffected for data transfer purposes.

There is a function called getpeername ( ) that is part of the sockets programming interface. A socket can also be queried as to which service is connected to it. For example, if host_C queried its socket to determine which service at the other end it was connected to, the response would be the intermediate host, host_B, instead of the actual service at the other end of the connection which in this example is host_A. Therefore, the getpeername would need input from the socket routing code at both ends of the connection, as well as some kernel changes, for it to work in a transparent fashion. For transparency, the getpeername would respond with host_A, the real end of the completed connection, if the socket in host_C was queried as to the party at the other end of the connection.

The details of the address mapping and socket routing facilities within the socket layer 32, which effectuates the cross domain connections, are described hereafter.

Gatewaying of socket based protocols is achieved by looping two sockets together at the top end. Such a mechanism would allow a router to create a path that would cross domain boundaries. A router in this context would be program code that would decide how to get to one data processing system to the other such as in the internet layer of TCP/IP. SNA also has similar code. The mechanism for looping two sockets together at the top end would not require file descriptors, or process switching time on the connecting node, once the connection is established. The following illustrates the changes to the socket layer interface of an operating system, such as the AIX operating system that utilizes the Berkeley sockets, that may be made to implement socket routing of this invention. These changes include the following:

modify "connect" to catch cross domain connects
add "connectto" to implement implicit routing from application level.
as an option, create library functions for routing
modify socket buffer handling, etc. to allow cross connections without process intervention
as an option, add function so getpeername works transparently
define socket routing protocol and messages (in kernel or as a daemon)
if needed, modify nameserver for domain gateways and routing info.

If connectto is not used to hide the routing from the user in a library, it is also possible to create library functions to perform the routing. However, the user will require a facility to figure out which machine has a socket routing daemon to service an intermediary. These functions(s) would allow a user program to invoke socket routing with minimal effort. Possible function to be defined are:

"get_route"—user program asks for route (useable by connect( ))
"get_type_of_socket_I_should_open_to_get_to_host"—done against the return from "get_route"—or does implicit "get_route".
connectto"—(1) looks up route, (2) creates a socket in proper domain, (3) established connection.
i.e., instead of
hp = gethostbyname(host);
(fill in sockaddr from hp . . . )
so = socket(AF_XX, SOCK_STREAM,0); connect (so, sockaddr, sockaddrlen);
a program does
so = connectto(host, SOCK_STREAM, 0);

In addition, modifying socket buffer handling will allow cross domain connections without process intervention. Previously, a socket is set up such that when data arrives, the data is stored in a queue while the data waits for a process to read it. At the gateway, the socket routing machine, when data arrives from one end of the connection, the data has to be automatically sent out the other side to the other end of the connection, and vice versa.

A current implementation of socket buffering would require that a process be running against all the sockets that are cross connected. A more efficient means would be to add this cross connection at a socket buffer layer, so that no process scheduling needs to be done to send the data on its way. In either case, flags are added to the socket data structures.

As previously mentioned, additional function is added to the "getpeername" function to enable the intermediate host to appear transparently in the connection between the originating host destination and the final host destination. Previously, the socket peer address has been handled by protocol dependent means. A change is required so that getpeername( ) works correctly. The change involves having the peer address propagated by the route daemons, in both directions. Then the routing code at each end of the connection would do a "set peer address" operation, which would override the protocol's peer address function.

The socket routing facility of this invention also requires a socket routing protocol and messages. It is desirable that the socket routing code handle routing in a flexible manner. To achieve this, a preferred embodiment of this invention has a socket routing daemon on each machine that is an interdomain gateway. The daemon would be listening on well-known socket(s) for routing requests. When a request came in (via a connecting socket) the routing daemon would examine the request and perform the desired action.

These requests (and their responses) are as follows:
Messages For Socket Routing Protocol
and the information that goes with each message
route request—sent to request a route be set up
originator address
hop destination address
flag for intermediate or final hop
route request reply—received to indicate completion and success/fail of route request
status for success or failure
connectup request—sent to establish normal data pathway
<none>
connectup reply—received to indicate completion and success/fail of connectup request
status for success or failure The socket routing service code is used to perform routing at the intermediate nodes, i.e. the gateway node. When a request for service arrives at the gateway machine, such as for any other socket connection, the request for service would arrive at a particular socket which would be the socket of the socket routing daemon. The process with this particular socket open could be either in the kernel or running as a user level process.

Therefore, the socket routing service code can be created as a daemon or in the kernel. Preferably, the socket routing service code will exist mostly or completely as a daemon. Some minor parts, such as ioctls (input output controls) to tie sockets together, may exist as part of the kernel. However, these minor parts support the daemon, and are not really a part of the socket routing service code. As an alternative, it is also possible to put the routing implementation part (as opposed to the route figuring out part) in the kernel, which would save process context switch time.

Another modification may be made to implement the socket routing of this invention. The nameserver may be modified for domain gateways and routing information. The (name) domain name server needs to have a type of data for inter(socket) domain gateways. It may also be desirable for it to find gateways when looking up a host address. It would be desirable if it would flag the fact that a host requires an inter(socket) domain gateway to get to it.

While the invention has been particularly shown and described with reference to a preferred embodiment including sockets, the underlying idea of cross domain connections could be achieved with other operating systems having other communication endpoints other than sockets. It will be understood by those skilled in the art that various changes in form and detail may be made without departing from the spirit and scope of the invention.

I claim:

1. A system for communicating between a first data processing system in a first network domain and a second data processing system in a second network domain, wherein said first network domain has a network protocol architecture different from said second network domain, said system comprising:
   at least one communication end point object in a layer of said first data processing system in said first network domain and at least one communication end point object in a layer of said second data processing system in said second network domain;
   means, independently of an application running on either of said data processing systems, for automatically establishing, in said layer of said first data processing system and in said layer of said second data processing system, a connection between said first processing system and said second processing system and comprising means for mapping protocols between said first and second network domain; and
   means for communicating over said connection between said first data processing system and said second data processing.

2. The system of claim 1 wherein the first network domain is a Transmission Control Protocol and the second network domain is a Systems Network Architecture.

3. A system for communicating between a first data processing system in a first network domain and a second data processing system in a second network domain, wherein said first network domain has a network protocol architecture different from said second network domain, said system comprising:
   at least one communication end point object in a layer of said first data processing system;
   an intermediate data processing system having at least one communication end point object in a layer of said intermediate data processing system;
   at least one communication end point object in a layer of said second data processing system;
   means, in said intermediate data processing system, for establishing automatically routed connections in said layer of said first data processing system, said layer of said second data processing system and said intermediate data processing system and comprising means for mapping protocols between said first and second network domain, said first and second processing systems each including means for executing respective application programs; and
   means for communicating through said automatically routed connections between said first data processing system in said first network domain and said second data processing system in said second network domain.

4. The system of claim 3 wherein said means for communication immediately sends any data received from one end of said routed connection to said other end of said routed connection.

5. The system of claim 3 wherein said first data processing system includes a socket layer of socket code in said first data processing system;
   said at least one communication end point object in a layer of said first data processing system is a socket in said socket layer of said first data processing system;
   said intermediate data processing system includes a socket layer of socket code in said intermediate data processing system;
   said at least one communication end point object in a layer of said intermediate data processing system is a socket in said socket layer of said intermediate data processing system;
   said second data processing system includes a socket layer of socket code in said second data processing system;
   said at least one communication end point object in a layer of said second data processing system is a socket in said socket layer of said second data processing system.

6. A system for communicating between a first data processing system in a first network domain and a second data processing system in a second network domain, wherein said first network domain has a network protocol architecture different from said second network domain, said system comprising:
   at least one socket in a socket layer of said first data processing system in said first network domain;
   at least one socket in a socket layer of said second data processing system in said second network domain;
   means, independently of an application running on either of said data processing systems, for establishing in said socket layer of said first data processing system and in said socket layer of said second data processing system an automatically routed socket connection between said first data processing system and said second data processing system and comprising means for mapping addresses between said first and second network domain; and means for communicating through said socket connection between said first data processing system and said second data processing system.

7. A method for communicating between a first data processing system in a first network domain having a socket and a second data processing system in a second network domain, wherein said first network domain has a network protocol architecture different from said second network domain, said method comprising:

establishing, by said first data processing system, a socket in said second data processing system in said second network domain; and invoking a routing facility to automatically establish a socket connection between said socket in said first data processing system and said socket in said second data processing system when said socket in said second data processing system is established and comprising means for mapping protocols between said first and second network domain;

communicating over said socket connection between said socket in said first data processing system in said first domain and said socket in said second data processing in said second domain; and executing an application program on each of said first and second processing systems.

8. An operating system for use with a plurality of data processing systems for communicating between a first data processing system in a first network domain and a second data processing system in a second network domain, wherein said first network domain has a network protocol architecture different from said second network domain, said operating system comprising:

at least one socket in a socket layer of said first data processing system in said first network domain;

at least one socket in a socket layer of said second data processing system in said second network domain;

means, independently of an application running on either of said data processing systems, for automatically routing, in said socket layer of said first data processing system and in said socket layer of said second data processing system, a socket connection between said first data processing system and said second data processing system and comprising means for mapping addresses between said first and second network domain;

means for establishing said socket connection; and means for communicating through said socket connection between said first data processing system and said second data processing system, wherein said data first and second processing systems each include means for executing respective application programs.

* * * * *